United States Patent

[11] 3,628,625

| [72] | Inventor | Richard Q. Boyles, Jr.<br>4956 Carol Lane, Atlanta, Ga. 30327 |
|---|---|---|
| [21] | Appl. No. | 834,991 |
| [22] | Filed | June 20, 1969 |
| [45] | Patented | Dec. 21, 1971 |

[54] VEHICLE TRACTION-INCREASING APPARATUS
2 Claims, 5 Drawing Figs.

| [52] | U.S. Cl. | 180/115, 180/127 |
|---|---|---|
| [51] | Int. Cl. | B60b 39/00 |
| [50] | Field of Search | 180/115, 127 |

[56] References Cited
UNITED STATES PATENTS

| 1,698,482 | 1/1929 | Nicin | 180/115 |
|---|---|---|---|
| 3,232,633 | 2/1966 | Feher | 180/115 X |
| 3,268,023 | 8/1966 | DiNapoli, Jr. | 180/115 |

*Primary Examiner*—A. Harry Levy
*Attorney*—Jones & Thomas

ABSTRACT: A vehicle traction-increasing apparatus for creating subambient pressure beneath the vehicle to place a load on the vehicle and increase the traction between the driving wheels of the vehicle and the road surface. The air induction system of the vehicle driving engine is connected to a housing located beneath the vehicle. The bottom portion of the housing is open and applied to the road surface. A flexible curtain is connected to the housing about its open side and is urged downwardly toward the road surface. The resiliency and configuration of the curtain is sufficient to allow only a small opening between the road surface and bottom edge of the curtain so that a significant pressure reduction must be created to flex the curtain, yet once the curtain is flexed away from the road surface, it forms a virtually friction-free bearing with the road surface and is movable across the road surface without appreciable drag.

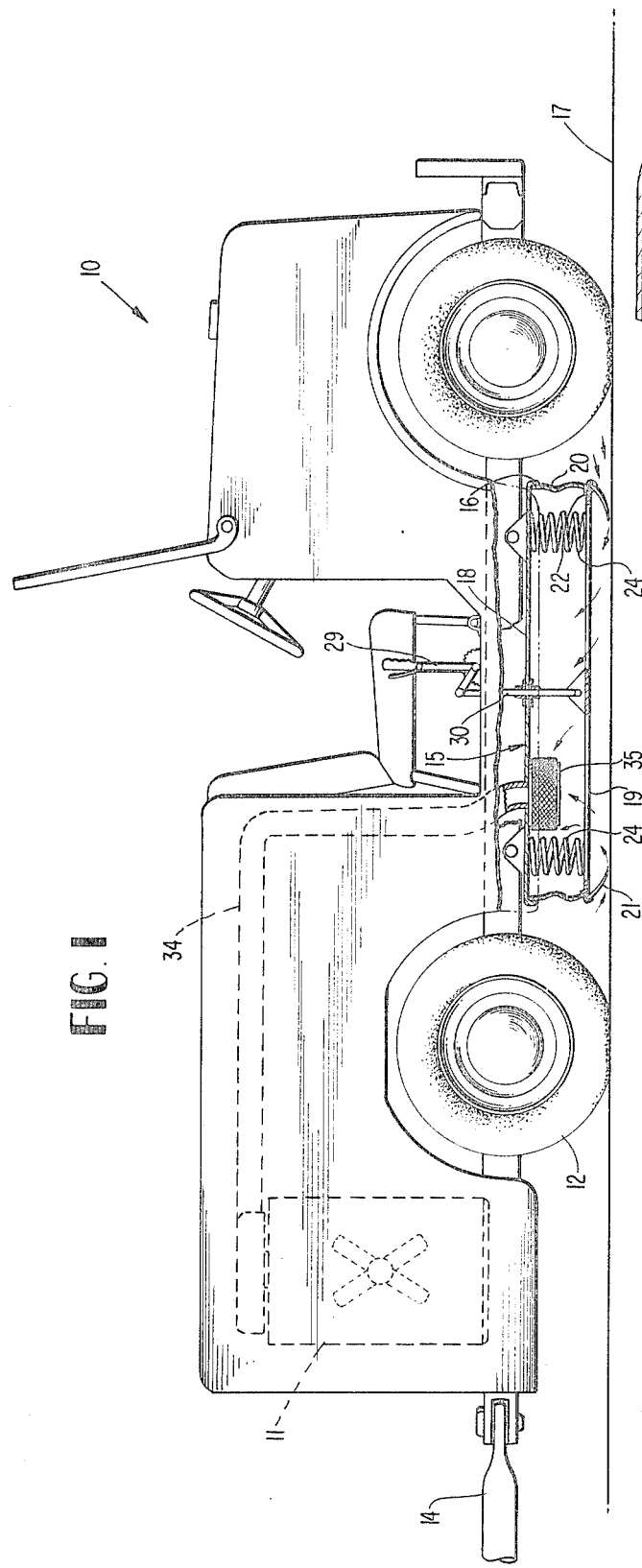
PATENTED DEC 21 1971
3,628,625
INVENTOR
RICHARD Q. BOYLES, JR.
BY Jones & Thomas
ATTORNEYS

VEHICLE TRACTION-INCREASING APPARATUS

BACKGROUND OF THE INVENTION

When an automotive vehicle accelerates or decelerates, one of the limitations in its rate of increase or decrease in velocity is the traction between its wheels and the road surface. When the traction or frictional contact between the wheels and the road surface is lost the wheels will spin or slide with respect to the road surface and the movement of the vehicle will not correspond to the rotation or directional disposition of its wheels.

When additional weight is added to a vehicle, the traction between the wheels of the vehicle and the road surface is increased. While the increase in traction is desirable under most circumstances, the increase in weight of the vehicle adds to the mass of the vehicle and is usually undesirable since more engine power is required to accelerate the vehicle and more braking power is required to decelerate the vehicle. Thus, a balance has usually been maintained between the desired traction of the wheels of a vehicle and the undesired weight increase required to attain increased traction. For instance, the typical towing vehicle normally utilized to tow large aircraft has been loaded with additional dead weight in order to increase the traction between its rear driving wheels and the road surface to enable the vehicle to accelerate and decelerate while towing the extremely heavy aircraft without spinning its wheels. However, the added dead weight increases the initial cost of the vehicle and makes the vehicle difficult and cumbersome to handle when not towing aircraft. In contrast, the drag racing vehicle usually has the major portion of its necessary engine and driver weight applied to the driving wheels of the vehicle, and virtually all other weight is removed from the vehicle to hold the mass of the entire vehicle to a minimum. While the low total mass allows a low driving force to rapidly accelerate the racing vehicle, the driving wheels normally lose traction and spin. When more weight is added to the racing vehicle to increase its traction, more driving force is required to accelerate the increased mass.

SUMMARY OF THE INVENTION

Briefly described, the present invention comprises a vehicle traction-increasing apparatus which applies a load or simulated weight to a vehicle without adding a corresponding increase in mass. The simulated weight increases the traction or frictional contact between the wheels of the vehicle and the road surface without increasing the mass of the vehicle and the vehicle is able to experience higher acceleration and deceleration rates. The air intake to the engine used to drive the vehicle is utilized to evacuate air from beneath the vehicle which causes the atmospheric air pressure above the vehicle to urge the vehicle toward the road surface, as if a weight had been added to the vehicle.

Thus, it is an object of this invention to provide a vehicle traction-increasing apparatus for adding a load to a vehicle to increase the traction between the wheels of the vehicle and the road surface without adding to the mass of the vehicle.

Another object of this invention is to provide an improved vehicle traction increasing apparatus which is self-regulating and functions to apply a load of predetermined simulated weight to the vehicle.

Another object of this invention is to provide a vehicle traction-increasing apparatus which is simple in construction, durable, operates automatically, and which can be connected to vehicles of various designs.

Other objects, features and advantages of the present invention will become apparent upon reading the following specification, when taken in conjunction with the accompanying drawing.

BRIEF DESCRIPTION OF THE DRAWING

FIG. 1 is a side elevational view of an aircraft towing vehicle, with parts broken away and shown in dashed lines to illustrate the traction-increasing apparatus.

FIG. 2 is a detailed showing of a portion of the curtain assembly and the manner in which the air flows between the road surface and the curtain assembly.

FIG. 3 is a detailed showing of the curtain assembly, similar to FIG. 2, but showing an alternate arrangement of the rear portion of the curtain assembly.

FIG. 4 is a detail showing of a modified curtain retraction assembly.

FIG. 5 is a detail showing of the airflow control valve in the air duct between the housing and the vehicle engine.

DESCRIPTION OF THE PREFERRED EMBODIMENT

Referring now in more detail to the drawing, in which like numerals indicate like parts throughout the several views, FIG. 1 shows a towing vehicle 10 of the type utilized to tow aircraft, or the like. Vehicle 10 includes engine 11 which is connected to its wheels 12 in a typical driving relationship (not shown). The vehicle is normally utilized to move aircraft around parking and loading areas of an airport, and it is the conventional practice to utilize a tow bar 14 connected between the rear portion of the vehicle and to the nose wheel of the aircraft to pull and guide the aircraft.

Towing vehicle 10 of FIG. 1 is constructed with minimum dead weight and is provided with a traction-increasing apparatus 15 located beneath the vehicle and in close proximity with the road surface 17. Traction-increasing apparatus 15 comprises housing 16 which includes substantially imperforate upper support plate 18, open framework 19, flexible sidewalls 20, and curtains 21. Flexible sidewalls 20 are connected at the upper edges to upper support plate 18 and at their lower edges to frame 22. Frame 22 is connected to open framework 19. Compression springs 24 extend between the inside surface of upper support plate 18 and open framework 19, to urge open framework 19 in a downward direction away from support plate 18 and toward road surface 17.

As is best shown in FIG. 2, curtains 21 are rigidly connected at their upper ends 25 to brackets 26. Brackets 26 hold curtains 21 so that they project in a sloped downward direction toward road surface 17 and inwardly beneath housing 16. The lower ends 28 of curtains 21 normally bow further inwardly beneath housing 16. Curtains 21 are fabricated from a durable but flexible material, and normally flex with the upward and downward movements of brackets 26 with respect to the road surface 17.

As is best shown in FIG. 1, open framework 19 within housing 16 can be raised in opposition to the force of springs 24 by means of lever 29. Connecting rod 30 extends between lever 29 at the driver's position of the vehicle and the space between housing 16 and the road surface 17. The lower end of connecting rod 30 projects through upper support plate 18 of housing 16 and is connected to open framework 19. When lever 29 is rotated, connecting rod 30 reciprocates through upper support plate 18 to lift open framework 19 and curtains 21 away from road surface 17.

As is shown in FIG. 4, the lower end of connecting rod 30 can also be reciprocally connected to open framework 19, with spring 31 positioned between spring cup 32 and framework 19. With this arrangement, lever 29 can be placed intermediate its end positions, to partially contract spring 31 and offset some of the downward force applied to framework 19 by compression springs 24. Of course, connecting rod 30 will still function to lift framework 19 when lever 29 is moved to its extreme position.

As is best shown in FIG. 1, conduit 34 is connected at one of its ends to the air induction system of engine 11 and at its other end to housing 16. When engine 11 is energized, it functions to exhaust air from housing 16. Conduit 34 can be connected to the air filter system of engine 11, and an additional filter 35 is connected to the inlet of conduit 34 within the confines of housing 16. In this manner, the air flowing to engine 11 from housing 16 will be virtually clean and dust free.

As is best shown in FIG. 5, air pressure control valve 36 is connected to conduit 34 and comprises a door 38 which is pivotal about hinge structure 39 and moves inwardly of conduit 34. Door 38 is normally maintained in its closed position, as illustrated in the full line illustration of FIG. 5 by means of adjustable bolt 40 extending between bracket 41 of door 38 and bracket 42 of conduit 34. Compression spring 44 is connected to the upper end of bolt 40 above bracket 41 and urges the door to its closed position. When the vacuum drawn in conduit 34 exceeds a predetermined pressure, door 38 will move toward its dashed line position by compressing spring 44. In order to adjust the pressure drawn in conduit 34, bolt 40 can be screwed into its nut or out of its nut to change the compression of spring 44. The arrangement is such that upon any abrupt changes in the pressure drawn by engine 11 due to a change in clearance of curtains 21 with respect to the road surface 17 or sudden increases or decreases in engine r.p.m.'s, door 38 will be modulate the pressure drawn in housing 16.

As is shown in FIG. 2, when the pressure in housing 16 is reduced to a subambient level, air will flow between road surface 17 and the lower ends 28 of curtains 21. While curtains 21 are resilient and tend to engage road surface 17, the flow of air beneath the curtains and the higher air pressure outside the curtains holds the curtains away from the road surface under normal conditions. As the r.p.m.'s of the engine 11 are increased to draw more air through conduit 34, air pressure control valve 35 will tend to open to keep the vacuum being drawn from becoming excessive. Furthermore, if air pressure control valve 36 is maintained in a closed condition by bolt and spring 44, an increase in the vacuum being drawn in housing 16 will result in more air flowing between curtains 21 and road surface 17. Of course, curtains 21 will be lifted further away from road surface 17 as the vacuum within housing 16 increases and the flow of air beneath the curtains increases. Moreover, flexible sidewalls 20 tend to be urged inwardly of housing 16 by atmospheric pressure as the vacuum within housing 16 is increased, and this tends to lift framework 19 and curtains 21. The lifting of curtains 21 and the increased airflow beneath the curtains tends to modulate or control the vacuum drawn within housing 16. The clearance of curtains 21 with respect to road surface 17, the flow of air beneath curtains 21, and the air pressure within housing !16 will depend largely upon the force with which curtains 21 are thrust toward the road surface 17 by gravity and by the influence of springs 24. Thus, springs 24 are effective to create the necessary force required to urge curtains 21 toward road surface 17, to create a partial seal between housing 16 and road surface 17.

As is shown in FIG. 4, the effectiveness of the seal between curtains 21 and the road surface can be controlled by spring 31 and connecting rod 30. Lever 29 can be rotated to lift connecting rod 30 and its spring 31 against framework 19, to partially offset some of the downward force exerted by springs 24 within housing 16. With this arrangement, curtains 21 will not be urged with as much force toward road surface 17, which reduces the effectiveness of the moving seal created between curtains 21 and road surface 17. Thus, the vacuum drawn within housing 16 is dissipated to some extent, which reduces the load felt by towing vehicle 10.

As is shown in FIG. 3, curtain 21a at the rear of housing 16 can be angled outwardly away from housing 16 while the remaining curtains 21 are maintained in the positions shown in FIGS. 1 and 2. The purpose for angling curtain 21a away from housing 16 is to allow this curtain to slide over road surface 17, and any protrusions or obstructions in the road surface will not damage the lower edge of the curtain as it might if the curtain were aimed toward the protrusion or obstruction. With curtain 21a angled away from beneath the housing, the atmospheric pressure will urge the curtain into engagement with road surface 17, and there will be little, if any, flow of air between curtain 21a and road surface 17.

The arrangement of FIG. 1 is such that when engine 11 is running at high r.p.m. as when the vehicle is towing an aircraft across an apron of an airport, curtains 21 will be drawn further away from road surface 17 during the rapid movement of the vehicle. Thus, the probability of damaging frictional engagement between curtains 21 and road surface 17 is reduced as the vehicle travels at high speeds. Furthermore, engine 11 will normally be operated at high speeds when initially attempting to move an aircraft, and when moving an aircraft. These particular times are when the loading of the vehicle is most desirable and is achieved by the traction increasing apparatus.

While the invention has been disclosed as being applied to an aircraft towing vehicle it should be obvious that the invention is useful in other environments. For instance, the invention can be used with racing vehicles, rail mounted vehicles such as railroad diesel engines, earth-moving vehicles, or in combination with virtually any self-propelled land vehicle in which an added load is desired without a corresponding addition of mass. The specific arrangement and construction of curtains 21 can be modified to fit the environment of the vehicle. For instance, vertical curtains might be used with a rail mounted vehicle which engage the sides of the rails, while in a crawler tractor the tread might be used as part of the "curtain" structure. Since the seal made between the curtains of the traction increasing apparatus is virtually a frictionless seal, the invention is highly useful in connection with a drag racer. The extremely high-engine r.p.m.'s normally used in drag racing which might normally create an excessive airflow within housing 16 can be alleviated by air pressure control valve 36. With this arrangement, the desired load can be automatically achieved without starving the engine of air.

Housing 16 should be constructed with relatively large length and width dimensions, in order that its vacuum can be applied to a relatively large road surface, since for a given subambient pressure a large increase in load can be achieved by increasing the road surface coverage of the housing. For instance, if 0.5 pounds per square inch vacuum is drawn within housing 15 and the housing has a road surface coverage of 5 feet wide and 6 feet long, or 30 square feet (4,320 sq. inches), a load of 2,160 pounds will be applied to the vehicle. Of course, if the vacuum applied to housing 16 is increased, the load will be increased.

While the curtain structure of the invention has been broadly described, it will be understood that either a single continuous curtain or a plurality of curtain sections can be utilized with the housing to create the "seal" beneath the vehicle. Furthermore, additional adjusting features can be employed in cooperation with springs 24 to assure that curtain 21 is urged with equal force at all points along its length toward road surface 17. Thus, while this invention has been described in detail with particular reference to preferred embodiments thereof, it will be understood that variations and modifications can be effected within the spirit and scope of the invention as described hereinbefore and as defined in the appended claims.

I claim:

1. An automotive vehicle comprising an internal combustion engine connected in driving relationship with the vehicle for propelling the vehicle along a road surface, housing means carried by said vehicle and defining an open side normally applied in close proximity to the road surface, said housing means including an upper frame member, a lower frame member positioned below said upper frame member, a bellows member connected between said upper and lower frame members, spring means connected to said lower frame member to urge said lower frame in a downward direction toward the road surface, flexible curtain means connected to said lower frame member, means connected to said lower frame member for lifting said lower frame member in an upward direction away from the road surface against the force of said spring means, and conduit means extending between said housing means and the air intake of said internal combustion engine to create a subambient pressure within said housing means and above the road surface to which the open side of said housing means is applied and simulate an increased weight applied to said vehicle.

2. The invention of claim 1 and further including a pressure responsive control valve in communication between the atmosphere and said housing means for regulating the pressure within said housing means.

* * * * *